United States Patent
Yamada

(10) Patent No.: US 10,432,094 B2
(45) Date of Patent: Oct. 1, 2019

(54) BOOST CONVERTER DEVICE AND CONTROL METHOD FOR BOOST CONVERTER DEVICE

(71) Applicant: TOYOTA JIDOSHA KABUSHIKI KAISHA, Toyota-shi, Aichi-ken (JP)

(72) Inventor: Shinri Yamada, Toyohashi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/270,854

(22) Filed: Feb. 8, 2019

(65) Prior Publication Data

US 2019/0252979 A1 Aug. 15, 2019

(30) Foreign Application Priority Data

Feb. 13, 2018 (JP) ................................. 2018-023437

(51) Int. Cl.
  *H02M 3/158* (2006.01)
  *B60L 53/20* (2019.01)
  *H02M 1/08* (2006.01)
  *H02P 27/08* (2006.01)

(52) U.S. Cl.
  CPC ........... *H02M 3/1584* (2013.01); *B60L 53/20* (2019.02); *H02M 1/08* (2013.01); *B60L 2240/52* (2013.01); *H02M 2003/1586* (2013.01); *H02P 27/08* (2013.01); *H02P 2201/09* (2013.01)

(58) Field of Classification Search
  CPC ...... H02M 3/155; H02M 3/156; H02M 3/158; H02M 3/1582; H02M 3/1584; H02M 3/157; H02M 1/4225; H02M 1/425; H02M 1/4258; H02M 5/40; H02M 5/42; H02M 5/453; G05F 1/70
  USPC .................. 363/34–37, 65–72; 323/207, 222, 323/271–272, 282–285
  See application file for complete search history.

(56) References Cited

U.S. PATENT DOCUMENTS

| 10,020,724 B2 * | 7/2018 | Weida ................... H02M 3/156 |
| 2006/0132104 A1 * | 6/2006 | Li ............................. G05F 1/70 323/207 |
| 2008/0238390 A1 | 10/2008 | Trivedi et al. |
| 2012/0229061 A1 | 9/2012 | Itoh et al. |
| 2014/0132191 A1 * | 5/2014 | Heo ........................ G05F 1/613 318/400.27 |

FOREIGN PATENT DOCUMENTS

| JP | 2012-080769 A | 4/2012 |
| JP | 2012-210138 A | 10/2012 |

* cited by examiner

*Primary Examiner* — Nguyen Tran
(74) *Attorney, Agent, or Firm* — Sughrue Mion, PLLC

(57) ABSTRACT

A boost converter device includes a first boost converter, a second boost converter, and a first electronic control unit. The first electronic control unit being configured to control switching of a first upper arm based on a first pulse width modulation signal and to control switching of a first lower arm based on a first inverted signal acquired by inverting the first pulse width modulation signal. The first electronic control unit is configured to control switching of a second lower arm based on a second pulse width modulation signal and to control switching of a second upper arm based on a second inverted signal acquired by inverting the second pulse width modulation signal.

4 Claims, 5 Drawing Sheets

BOOST CONVERTER DEVICE AND CONTROL METHOD FOR BOOST CONVERTER DEVICE

INCORPORATION BY REFERENCE

The disclosure of Japanese Patent Application No. 2018-023437 filed on Feb. 13, 2018 including the specification, drawings and abstract is incorporated herein by reference in its entirety.

BACKGROUND

1. Technical Field

The disclosure relates to a boost converter device and a control method for a boost converter device and more particularly to a boost converter device including first and second boost converters and a control method for a boost converter device.

2. Description of Related Art

A boost converter device including first and second voltage conversion units that are connected to a DC battery and a load to be in parallel with each other, first and second drive circuits that drive the first and second voltage conversion units, respectively, and a controller that outputs first and second PWM signals to first and second drive circuits, respectively has been proposed (for example, see Japanese Unexamined Patent Application Publication No. 2012-210138 (JP 2012-210138 A)). Here, the first voltage conversion unit includes two switching elements which are a first upper arm and a first lower arm and a first reactor and performs exchange of an electric power accompanied by voltage conversion between the DC battery and the load. The second voltage conversion unit includes two switching elements which are a second upper arm and a second lower arm and a second reactor and performs exchange of electric power between the DC battery and the load accompanied with voltage conversion. In this boost converter device, the controller generates a first PWM signal from a first duty command and a first carrier of the first voltage conversion unit and outputs the first PWM signal to the first drive circuit. The first drive circuit alternately turns on and off the first upper arm and the first lower arm based on the first PWM signal. Similarly, the controller generates a second PWM signal from a second duty command and a second carrier of the second voltage conversion unit and outputs the second PWM signal to the second drive circuit. The second drive circuit alternately turns on and off the second upper arm and the second lower arm based on the second PWM signal.

SUMMARY

In such a boost converter device, in order to reduce ripples of a current which is output to a load side from the first and second voltage conversion units, first and second carriers with the same frequency and with phases different by 180 degrees are generated and the first and second PWM signals are generated by comparing the first and second carriers with the first and second duty commands. In this case, the first and second carriers need to be synchronized such that the phases thereof are different from each other by 180 degrees, and a generation unit for the first carrier and a generation unit for the second carrier need to be connected to each other by a synchronization line when both generation units are provided. Accordingly, there is demand for construction of a technique capable of performing equivalent control more simply, specifically, using the same carrier.

The disclosure enables control equivalent to that when phases of two carriers are different from each other by 180 degrees to be performed using the same carrier.

The disclosure employs the following configurations to achieve the above-mentioned objective.

A first aspect of the disclosure is a boost converter device. The boost converter device including a first boost converter, a second boost converter, and an electronic control unit configured to control the first boost converter and the second boost converter. The first boost converter includes a first reactor and two switching elements which are a first upper arm and a first lower arm. The first boost converter is configured to perform exchange of an electric power accompanied by conversion of a voltage between a power supply and an electrical load. The second boost converter includes a second reactor and two switching elements of a second upper arm and a second lower arm. The second boost converter is configured to perform exchange of the electric power accompanied by conversion of the voltage between the power supply and the electrical load. The electronic control unit is configured to generate a first pulse width modulation signal by comparison between a first control duty for the first boost converter and a carrier. The electronic control unit is configured to control switching of the first upper arm based on the first pulse width modulation signal and to control switching of the first lower arm based on a first inverted signal acquired by inverting the first pulse width modulation signal. The electronic control unit is configured to generate a second pulse width modulation signal by comparison between a corrected control duty and the carrier. The corrected control duty is a duty acquired by subtracting a second control duty for the second boost converter from value 1. The electronic control unit is configured to control switching of the second lower arm based on the second pulse width modulation signal and to control switching of the second upper arm based on a second inverted signal acquired by inverting the second pulse width modulation signal.

With this configuration, the first pulse width modulation signal is generated by comparison between the first control duty for the first boost converter and the carrier, switching of the first upper arm is controlled based on the first pulse width modulation signal, and switching of the first lower arm is controlled based on the first inverted signal acquired by inverting the first pulse width modulation signal. The second pulse width modulation signal is generated by comparison between the corrected control duty acquired by subtracting the second control duty for the second boost converter from value 1 and the same carrier as being used to generate the first pulse width modulation signal, switching of the second lower arm is controlled based on the second pulse width modulation signal, and switching of the second upper arm is controlled based on the second inverted signal acquired by inverting the second pulsed width modulation signal. Accordingly, it is possible to perform control equivalent to that when phases of two carriers are different from each other by 180 degrees using the same carrier.

The boost converter device may further include a second electronic control unit configured to transmit a required carrier frequency to the electronic control unit. The electronic control unit may be configured to guard the required carrier frequency with upper and lower limits and to set a control carrier frequency. The electronic control unit may be configured to generate the carrier based on the control carrier frequency. With this configuration, it is possible to satisfactorily set the control carrier frequency to a value within an appropriate range.

The boost converter device may further include a second electronic control unit configured to transmit a first required duty for the first boost converter and a second required duty for the second boost converter to the electronic control unit. The electronic control unit may be configured to guard the first required duty with upper and lower limits and to set the first control duty. The electronic control unit may be configured to guard the second required duty with upper and lower limits to set the second control duty. With this configuration, it is possible to more satisfactorily set the first and second control duties to values within an appropriate range.

A second aspect of the disclosure is a control method for a boost converter device. The boost converter device includes a first boost converter, a second boost converter, and an electronic control unit configured to control the first boost converter and the second boost converter. The first boost converter includes a first reactor and two switching elements of a first upper arm and a first lower arm. The first boost converter is configured to perform exchange of an electric power accompanied by conversion of a voltage between a power supply and an electrical load. The second boost converter includes a second reactor and two switching elements of a second upper arm and a second lower arm. The second boost converter is configured to perform exchange of the electric power accompanied by conversion of the voltage between the power supply and the electrical load. The control method includes: generating, by the electronic control unit, a first pulse width modulation signal by comparison between a first control duty for the first boost converter and a carrier; controlling, by the electronic control unit, switching of the first upper arm based on the first pulse width modulation signal and controlling, by the electronic control unit, switching of the first lower arm based on a first inverted signal acquired by inverting the first pulse width modulation signal; generating, by the electronic control unit, a second pulse width modulation signal by comparison between a corrected control duty and the carrier, the corrected control duty being a duty acquired by subtracting a second control duty for the second boost converter from value 1; and controlling, by the electronic control unit, switching of the second lower arm based on the second pulse width modulation signal and controlling, by the electronic control unit, switching of the second upper arm based on a second inverted signal acquired by inverting the second pulse width modulation signal.

With this configuration, the first pulse width modulation signal is generated by comparison between the first control duty and the carrier for the first boost converter, switching of the first upper arm is controlled based on the first pulse width modulation signal, and switching of the first lower arm is controlled based on the first inverted signal acquired by inverting the first pulse width modulation signal. The second pulse width modulation signal is generated by comparison between the corrected control duty acquired by subtracting the second control duty for the second boost converter from value 1 and the same carrier as being used to generate the first pulse width modulation signal, switching of the second lower arm is controlled based on the second pulse width modulation signal, and switching of the second upper arm is controlled based on the second inverted signal acquired by inverting the second pulsed width modulation signal. Accordingly, it is possible to perform control equivalent to that when phases of two carriers are different from each other by 180 degrees using the same carrier.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
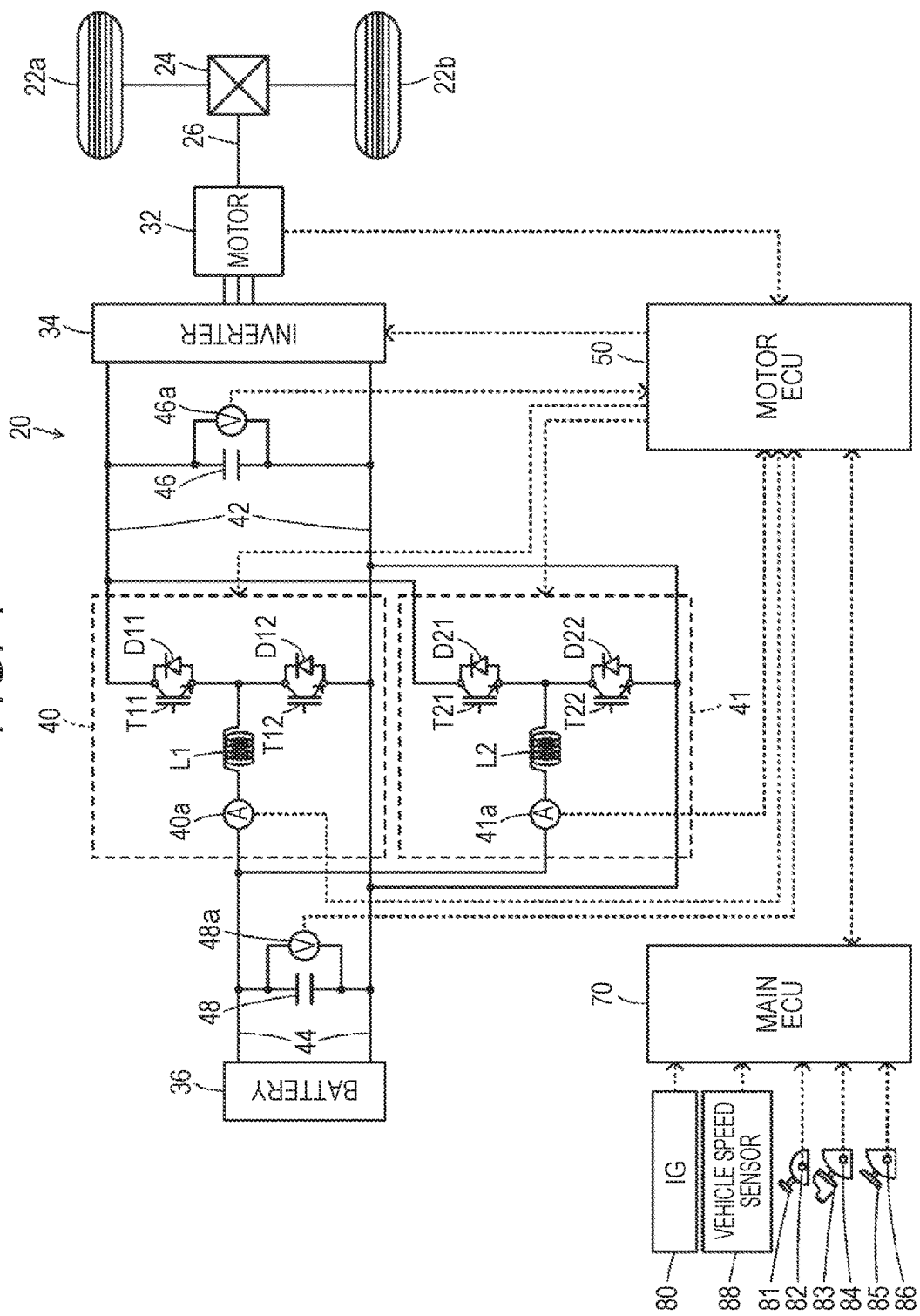
FIG. 1 is a diagram schematically illustrating a configuration of an electric vehicle 20 in which a boost converter device according to an embodiment of the disclosure is mounted.

FIG. 1 is a diagram schematically illustrating a configuration of an electric vehicle 20 in which a boost converter device according to an embodiment of the disclosure is mounted. As illustrated in the drawing, the electric vehicle 20 according to the embodiment includes a motor 32, an inverter 34, a battery 36 serving as a power supply, first and second boost converters 40 and 41, a motor electronic control unit (hereinafter referred to as a "motor ECU") 50, and a main electronic control unit (hereinafter referred to as a "main ECU") 70. Here, a "boost converter device" according to the embodiment includes the first and second boost converters 40 and 41 and the motor ECU 50.

The motor 32 is constituted, for example, by a synchronous generator motor, and a rotor of the motor 32 is connected to a drive shaft 26 which is connected to driving wheels 22a and 22b via a differential gear 24. The inverter 34 is connected to the motor 32 and is also connected to a high-voltage power line 42. The motor 32 is rotationally driven by causing the motor ECU 50 to control switching of a plurality of switching elements (not illustrated) of the inverter 34. A smoothing capacitor 46 is connected between a positive electrode line and a negative electrode line of the high-voltage power lines 42.

The battery 36 is constituted, for example, by a lithium-ion secondary battery or a nickel-hydride secondary battery and is connected to a low-voltage power line 44. A smoothing capacitor 48 is connected between a positive electrode line and a negative electrode line of the low-voltage power line 44.

The first boost converter 40 is connected to the high-voltage power line 42 and the low-voltage power line 44 and is constituted by a known step-up/down converter including two transistors T11 and T12, two diodes D11 and D12, and a reactor L1. The transistor T11 (a first upper arm) is connected to the positive electrode line of the high-voltage power line 42. The transistor T12 (a first lower arm) is connected to the transistor T11 and the negative electrode lines of the high-voltage power line 42 and the low-voltage power line 44. The reactor L1 is connected to a connection point between the transistors T11 and T12 and the positive electrode line of the low-voltage power line 44. When an ON-time ratio of the transistors T11 and T12 is adjusted by the motor ECU 50, the first boost converter 40 supplies electric power of the low-voltage power line 44 to the high-voltage power line 42 accompanying step-up of a voltage or supplies electric power of the high-voltage power line 42 to the low-voltage power line 44 accompanying step-down of a voltage. Hereinafter, the transistor T11 may be referred to as a "first upper arm" and the transistor T12 may be referred to as a "first lower arm."

The second boost converter 41 is connected to the high-voltage power line 42 and the low-voltage power line 44 in parallel to the first boost converter 40 and is constituted by a known step-up/down converter including two transistors T21 and T22, two diodes D21 and D22, and a reactor L2, similarly to the first boost converter 40. When an ON-time ratio of the transistors T21 and T22 is adjusted by the motor ECU 50, the second boost converter 41 supplies electric power of the low-voltage power line 44 to the high-voltage power line 42 accompanying step-up of a voltage or supplies electric power of the high-voltage power line 42 to the low-voltage power line 44 accompanying step-down of a voltage. Hereinafter, the transistor T21 may be referred to as a "second upper arm" and the transistor T22 may be referred to as a "second lower arm."

Although not illustrated in the drawing, the motor ECU 50 is constituted by a microprocessor such as a CPU, and includes a ROM that stores a processing program, a RAM that temporarily stores data, a nonvolatile flash memory, input and output ports, and a communication port in addition to the CPU. Signals from various sensors are input to the motor ECU 50 via the input port. Examples of the signal input to the motor ECU 50 include a rotational position θm from a rotational position sensor that detects a rotational position of the rotor of the motor 32 and phase currents Iu and Iv from current sensors that detect currents flowing in phases of the motor 32. Examples thereof further include a voltage VH of the high-voltage power line 42 (the capacitor 46) from a voltage sensor 46a that is attached between the terminals of the capacitor 46 and a voltage VL of the low-voltage power line 44 (the capacitor 48) from a voltage sensor 48a that is attached between the terminals of the capacitor 48. Examples thereof further include currents IL1 and IL2 of the reactors L1 and L2 from current sensors 40a and 41a that are attached in series to the reactors L1 and L2 of the first and second boost converters 40 and 41. Switching control signals to a plurality of switching elements of the inverter 34, switching control signals to the transistors T11, T12, T21, and T22 of the first and second boost converters 40 and 41, or the like are output from the motor ECU 50 via the output port. The motor ECU 50 calculates an electrical angle θe and a rotation speed Nm of the motor 32 based on the rotational position θm of the rotor of the motor 32 from the rotational position sensor. The motor ECU 50 is connected to the main ECU 70 via a communication line.

Although not illustrated in the drawing, the main ECU 70 is constituted by a microprocessor such as a CPU, and includes a ROM that stores a processing program, a RAM that temporarily stores data, a nonvolatile flash memory, input and output ports, and a communication port in addition to the CPU. Signals from various sensors are input to the main ECU 70 via the input port. Examples of the signal input to the main ECU 70 include an ignition signal from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88. Examples thereof further include a voltage Vb of the battery 36 from a voltage sensor (not illustrated) that is attached between the terminals of the battery 36, a current Ib of the battery 36 from a current sensor (not illustrated) that is attached to the output terminal of the battery 36, and a temperature Tb of the battery 36 from a temperature sensor (not illustrated) that is attached to the battery 36. As described above, the main ECU 70 is connected to the motor ECU 50 via a communication line.

In the electric vehicle 20 according to the embodiment having the above-mentioned configuration, the main ECU 70 sets a required torque Td* required for traveling (required for the drive shaft 26) based on the accelerator operation amount Acc and the vehicle speed V and sets a torque command Tm* for the motor 32 such that the set required torque Td* is output from the motor 32. Subsequently, the main ECU 70 sets a target voltage VH* for the high-voltage power line 42 based on the torque command Tm* and the rotation speed Nm of the motor 32 and calculates a load power Pm of the motor 32 by multiplying the torque command Tm* for the motor 32 by the rotation speed Nm. Then, the main ECU 70 sets required duties D1tag and D2tag for the first and second boost converters 40 and 41 based on the target voltage VH* and the voltage VH of the high-voltage power line 42, the load power Pm of the motor 32, and the currents IL1 and IL2 of the reactors L1 and L2, and sets a required carrier frequency fctag based on the load (the temperature) of the first and second boot converters 40 and 41 or the like. When the torque command Tm* of the motor 32, the required duties D1tag and D2tag of the first and second boost converters 40 and 41, and the required carrier frequency fctag are set in this way, the main ECU 70 transmits the set values to the motor ECU 50. The motor ECU 50 controls switching of the plurality of switching elements of the inverter 34 such that the motor 32 is driven in accordance with the torque command Tm*. The motor ECU 50 controls switching of the transistors T11, T12, T21, and T22 of the first and second boost converters 40 and 41 based on the required duties D1tag and D2tag of the first and second boost converters 40 and 41 and the required carrier frequency fctag.

Figure 2:
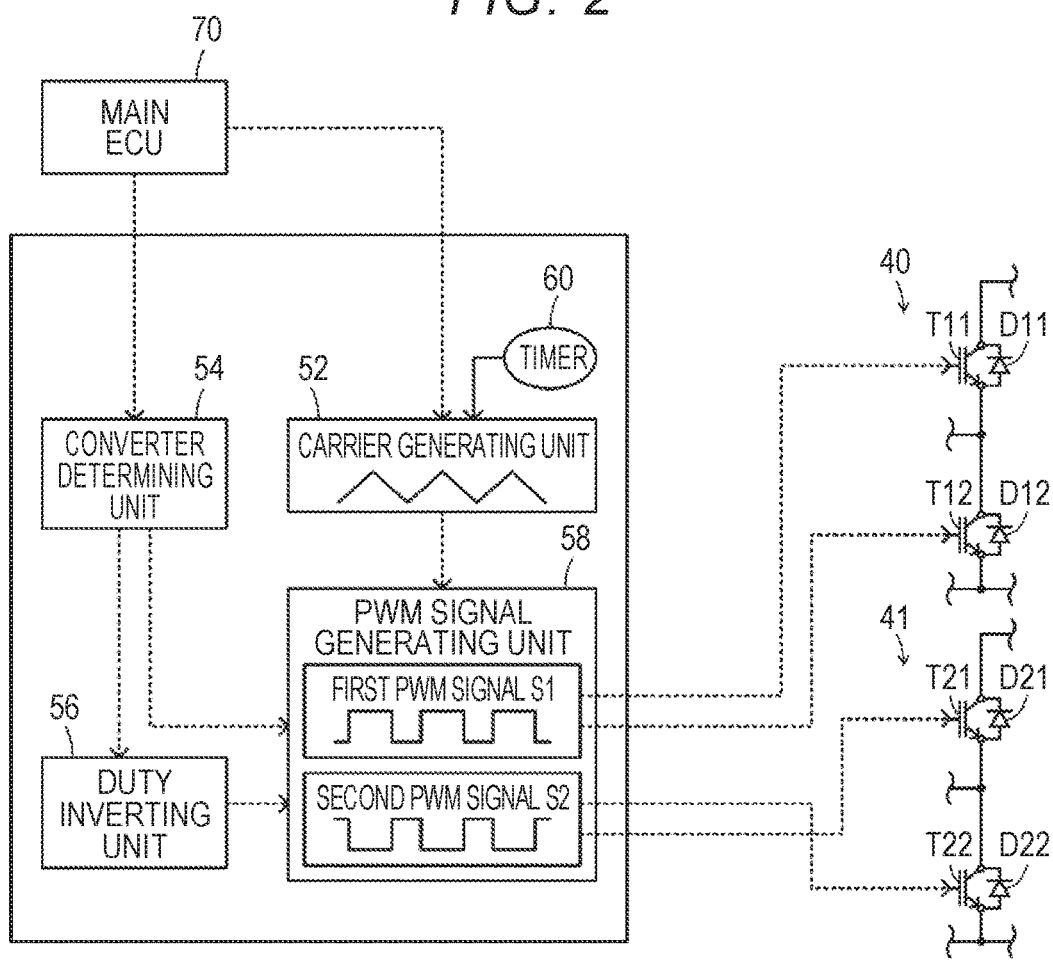
FIG. 2 is a diagram schematically illustrating a configuration of a motor ECU 50 with a focus on a function of a controller for the boost converter device.

FIG. 2 is a diagram schematically illustrating a configuration of the motor ECU 50 with a focus on a function of a controller for the boost converter device. The motor ECU 50 includes a carrier generating unit 52, a converter determining unit 54, a duty inverting unit 56, a PWM signal generating unit 58, and a timer 60.

Figure 3:
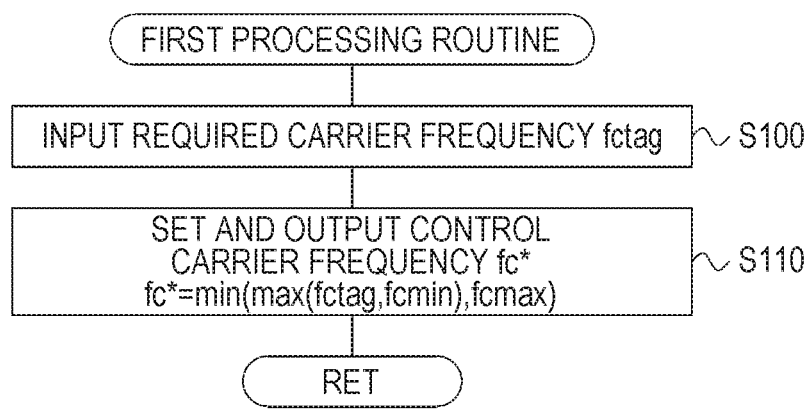
FIG. 3 is a flowchart illustrating an example of a first processing routine which is performed by a carrier generating unit 52.

The carrier generating unit 52 performs a first processing routine illustrated in FIG. 3. This routine is repeatedly performed. When this routine is performed, the carrier generating unit 52 receives the required carrier frequency fctag from the main ECU 70 (Step S100), sets a control carrier frequency fc* by guarding the received required carrier frequency fctag with upper-limit and lower-limit frequencies fcmax and fcmin as expressed by Equation (1) (Step S110), and then ends this routine. Here, the upper-limit and lower-limit frequencies fcmax and fcmin are determined depending on a performance of the motor ECU 50 or the like, for example, several MHz may be used as the upper-limit frequency fcmax, and for example, several Hz may be used as the lower-limit frequency fcmin. Through these processes, it is possible to satisfactorily set the control carrier frequency fc* to a value within an appropriately range.

$$fc^* = \min(\max(fctag, fcmin), fcmax) \tag{1}$$

The carrier generating unit 52 generates a carrier (a triangular wave) based on the set control carrier frequency fc* and a signal from the timer 60, and outputs the generated carrier to the PWM signal generating unit 58.

Figure 4:
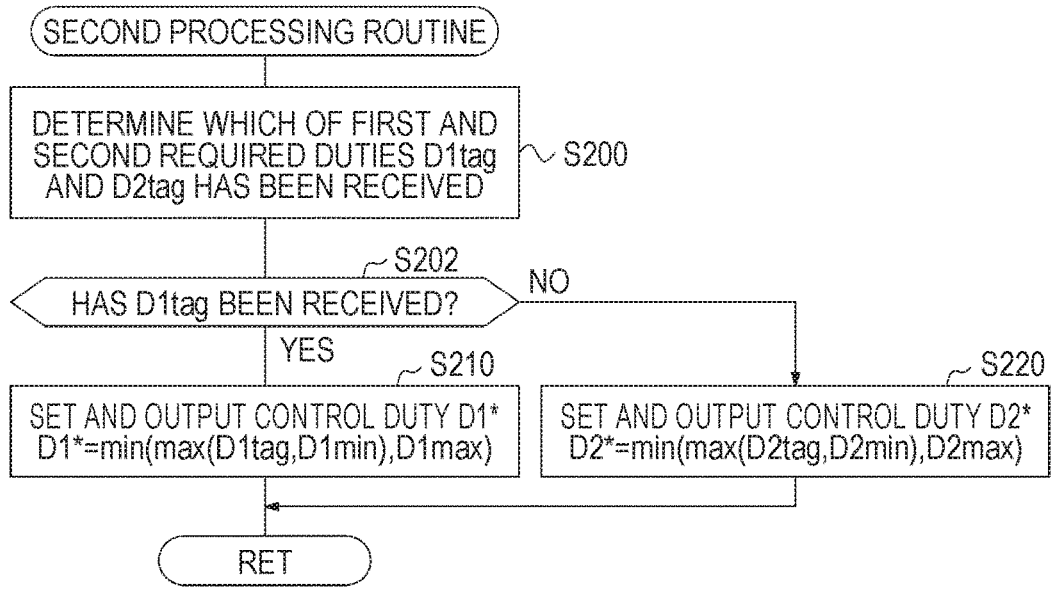
FIG. 4 is a flowchart illustrating an example of a second processing routine which is performed by a converter determining unit 54.

The converter determining unit 54 performs a second processing routine illustrated in FIG. 4. This routine is repeatedly performed. When this routine is performed, the converter determining unit 54 determines which of the required duties D1tag and D2tag has been received from the main ECU 70 (Step S200). It is assumed that the main ECU 70 alternately outputs the required duty D1tag and the required duty D2tag to the motor ECU 50.

When it is determined that the required duty D1tag has been received from the main ECU 70, the converter determining unit 54 sets a control duty D1* by guarding the required duty D1tag with upper-limit and lower-limit duties D1max and D1min as expressed by Equation (2), outputs the set control duty D1* to the PWM signal generating unit 58 (Step S210), and ends this routine. Here, value 1 is used as the upper-limit duty D1max and 0 is used as the lower-limit duty D1min. Through these processes, it is possible to satisfactorily set the control duty D1* to a value within an appropriately range.

$$D1^* = \min(\max(D1tag, D1min), D1max) \tag{2}$$

On the other hand, when it is determined that the required duty D2tag has been received from the main ECU 70, the converter determining unit 54 sets a control duty D2* by guarding the required duty D2tag with upper-limit and lower-limit duties D2max and D2min as expressed by Equation (3), outputs the set control duty D2* to the duty inverting unit 56 (Step S220), and ends this routine. Here, value 1 is used as the upper-limit duty D2max and 0 is used as the lower-limit duty D2min. Through these processes, it is possible to satisfactorily set the control duty D2* to a value within an appropriately range.

$$D2^* = \min(\max(D2tag, D2min), D2max) \tag{3}$$

The duty inverting unit 56 sets a corrected control duty D2a* to a value (1−D2*) acquired by subtracting the control duty D2* from the converter determining unit 54 from value 1 and outputs the set corrected control duty D2a* to the PWM signal generating unit 58.

The PWM signal generating unit 58 generates a first PWM signal S1a by comparison between the control duty D1* from the converter determining unit 54 and the carrier from the carrier generating unit 52, controls switching of the first upper arm (the transistor T11) of the first boost converter 40 based on the first PWM signal S1a, and controls switching of the first lower arm (the transistor T12) of the first boost converter 40 based on a first inverted signal S1b acquired by inverting the first PWM signal S1a. Here, the first PWM signal S1a is a signal which is switched from OFF to ON when the value of the carrier becomes equal to or greater than the control duty D1* at the time of rising of the carrier (the triangular wave) and which is switched from ON to OFF when the value of the carrier becomes equal to or less than the control duty D1* at the time of falling of the carrier. Accordingly, as the control duty D1* increases, the ON-time ratio of the first upper arm decreases and the ON-time ratio of the first lower arm increases in one cycle of the carrier.

The PWM signal generating unit 58 generates a second PWM signal S2a based on the corrected control duty D2a* from the duty inverting unit 56 and the carrier from the carrier generating unit 52 (the same carrier as used to generate the first PWM signal S1a), controls switching of the second lower arm (the transistor T22) of the second boost converter 41 based on the second PWM signal S2a, and controls switching of the second upper arm (the transistor T21) of the second boost converter 41 based on a second inverted signal S2b acquired by inverting the second PWM signal S2a. Here, the second PWM signal S2a is a signal which is switched from OFF to ON when the value of the carrier becomes equal to or greater than the corrected control duty D2a*(=1−D2*) at the time of rising of the carrier (the triangular wave) and which is switched from ON to OFF when the value of the carrier becomes equal to or less than the corrected control duty D2a* at the time of falling of the carrier. Accordingly, as the corrected control duty D2a* increases, the ON-time ratio of the second lower arm decreases and the ON-time ratio of the second upper arm increases in one cycle of the carrier. That is, as the control duty D2* increases, the ON-time ratio of the second upper arm decreases and the ON-time ratio of the second lower arm increases in one cycle of the carrier.

Figure 5:
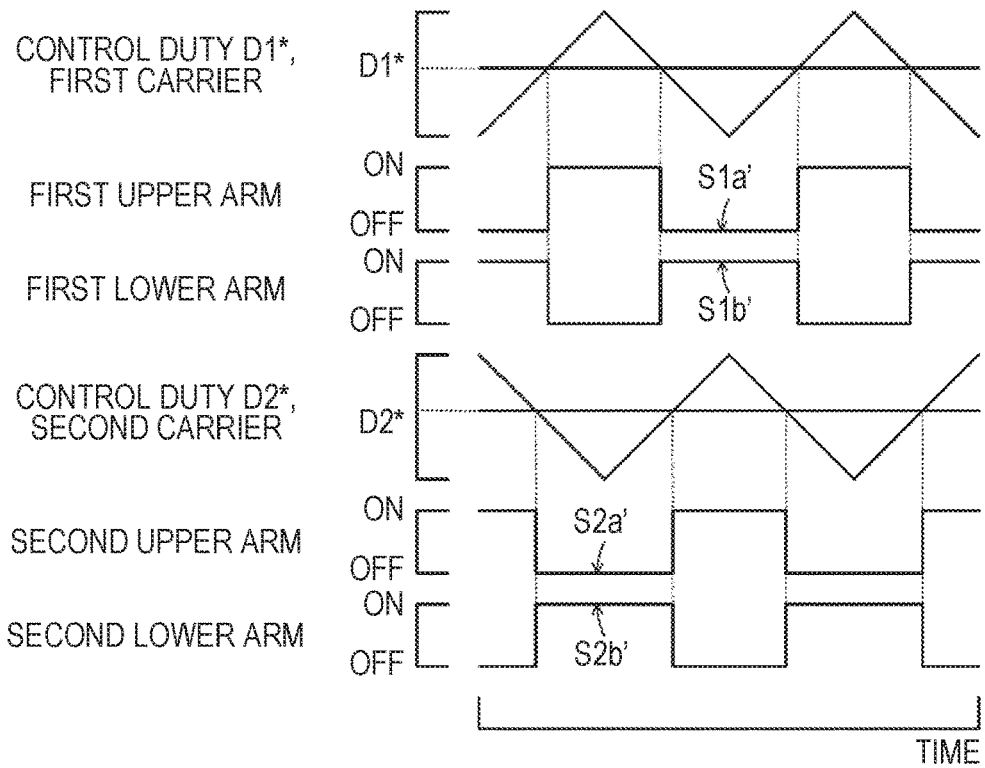
FIG. 5 is a diagram illustrating an example of states of a control duty D1*, a first carrier, ON and OFF of first upper and lower arms, a control duty D2*, a second carrier, and ON and OFF of second upper and lower arms according to a comparative example.
Figure 6:
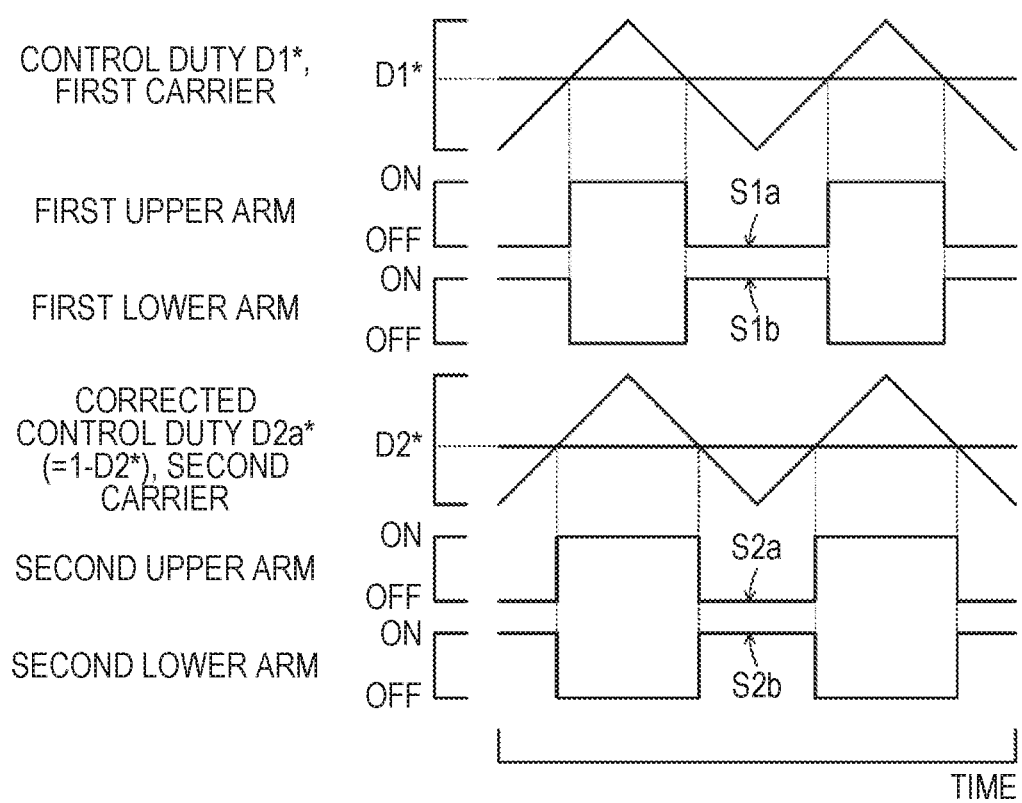
FIG. 6 is a diagram illustrating an example of states of a control duty D1*, a first carrier, ON and OFF of first upper and lower arms, a corrected control duty D2a* (=1−D2*), a second carrier, and ON and OFF of second upper and lower arms according to the embodiment.

FIG. 5 is a diagram illustrating an example of states of the control duty D1*, the first carrier, ON and OFF of the first upper and lower arms, the control duty D2*, the second carrier, and ON and OFF of the second upper and lower arms according to a comparative example. FIG. 6 is a diagram illustrating an example of states of the control duty D1*, the first carrier, ON and OFF of the first upper and lower arms, the corrected control duty D2a* (=1−D2*), the second carrier, and ON and OFF of the second upper and lower arms according to the embodiment. In FIG. 5, the first carrier and the second carrier have the same frequency and phases different from each other by 180 degrees. In FIG. 6, the first carrier and the second carrier are completely the same (are the carrier which is generated by the carrier generating unit 52 and output to the PWM signal generating unit 58).

As illustrated in FIG. 5, in the comparative example, switching of the first upper arm is controlled based on a first PWM signal S1a' which is generated by comparison between the control duty D1* and the first carrier, and switching of the first lower arm is controlled based on a first inverted signal S1b' acquired by inverting the first PWM signal S1a'. Switching of the second upper arm is controlled based on a second PWM signal S2a' which is generated by comparison between the control duty D2* and the second carrier, and switching of the second lower arm is controlled based on a second inverted signal S2b' acquired by inverting the second PWM signal S2a'. At this time, by setting the first carrier and the second carrier to the same frequency and phases different from each other by 180 degrees, it is possible to reduce ripples of a current of the high-voltage power line 42. In this case, the first and second carriers need to be synchronized, and a generation unit for the first carrier and a generation unit for the second carrier need to be connected to each other by a synchronization line when both generation units are provided.

As illustrated in FIG. 6, in the embodiment, switching of the first upper arm is controlled based on the first PWM signal S1a which is generated by comparison between the control duty D1* and the first carrier, and switching of the first lower arm is controlled based on the first inverted signal S1b acquired by inverting the first PWM signal S1a. Switching of the second lower arm is controlled based on the second PWM signal S2a which is generated by comparison between the corrected control duty D2a* (=1−D2*) and the second carrier (the same carrier as the first carrier), and switching of the second upper arm is controlled based on the second inverted signal S2b acquired by inverting the second PWM signal S2a In both the comparative example and the embodiment, since the first PWM signals S1a' and S1a are generated by comparison between the control duty D1* and the first carrier, the first PWM signal S1a' and the first inverted signal S1b' illustrated in FIG. 5 correspond to the first PWM signal S1a and the first inverted signal S1b illustrated in FIG. 6. In both the comparative example and the embodiment, switching of the first upper arm is controlled based on the first PWM signals S1a' and S1a and switching of the first lower arm is controlled based on the first inverted signals S1b' and S1b. Accordingly, in the comparative example and the embodiment, equivalent control can be performed for the first boost converter 40.

Since the second PWM signal S2a' is generated by comparison between the control duty D2* and the second carrier in the comparative example and the second PWM signal S2a is generated by comparison between the corrected control duty D2a* (=1−D2*) and the second carrier in the embodiment, the second PWM signal S2a' and the second inverted signal S2b' illustrated in FIG. 5 correspond to the second inverted signal S2b and the second PWM signal S2a illustrated in FIG. 6 in consideration of a relationship between the control duty D2* and the second carrier. Switching of the second upper arm is controlled based on the second PWM signal S2a' in the comparative example and the second inverted signal S2b in the embodiment, and switching of the second lower arm is controlled based on the second inverted signal S2b' in the comparative example and the second PWM signal S2a in the embodiment. Accordingly, in the comparative example and the embodiment, equivalent control is performed for the second boost converter 41.

Accordingly, in the embodiment, control equivalent to that in the comparative example, that is, control equivalent to that when the phases of two carriers are different from each other by 180 degrees, can be performed using the same carrier. Accordingly, it is possible to reduce ripples of a current in the high-voltage power line 42.

In the above-mentioned boost converter device which is mounted in the electric vehicle 20 according to the embodiment, the first PWM signal S1a is generated by comparison between the control duty D1* and the carrier, switching of the first upper arm (the transistor T11) is controlled based on the generated first PWM signal S1a, and switching of the first lower arm (the transistor T12) is controlled based on the first inverted signal S1b acquired by inverting the first PWM signal S1a. The corrected control duty D2a* is calculated by subtracting the control duty D2* from value 1, the second PWM signal S2a is generated by comparison between the corrected control duty D2a* and the same carrier as used to generate the first PWM signal S1a, switching of the second lower arm (the transistor T22) is controlled based on the generated second PWM signal S2a, and switching of the second upper arm (the transistor T21) is controlled based on the second inverted signal S2b acquired by inverting the second PWM signal S2a. Accordingly, it is possible to perform control equivalent to that when the phases of two carriers are different from each other by 180 degrees using the same carrier. As a result, it is possible to reduce ripples of a current in the high-voltage power line 42 using the same carrier.

In the booster converter device which is mounted in the electric vehicle 20 according to the embodiment, the motor ECU 50 sets the control carrier frequency fc* by guarding the required carrier frequency fctag from the main ECU 70 with upper and lower limits as expressed by Equation (1), but the required carrier frequency fctag may be set as the control carrier frequency fc* without any change.

In the booster converter device which is mounted in the electric vehicle 20 according to the embodiment, the motor ECU 50 sets the control duty D1* by guarding the required duty D1tag from the main ECU 70 with upper and lower limits as expressed by Equation (2), but the required duty D1tag may be set as the control duty D1* without any change. The motor ECU 50 sets the control duty D2* by guarding the required duty D2tag from the main ECU 70 with upper and lower limits as expressed by Equation (3), but the required duty D2tag may be set as the control duty D2* without any change.

Correspondence between principal elements of the embodiment and principal elements of the disclosure described in the SUMMARY will be described below. In the embodiment, the first boost converter 40 is an example of the "first boost converter." The second boost converter 41 is an example of the "second boost converter." The motor ECU 50 is an example of the "first electronic control unit" and the "electronic control unit." The main ECU 70 is an example of the "second electronic control unit."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY That is, it should be noticed that the disclosure described in the SUMMARY is to be construed based on the description of the SUMMARY and the embodiment is only a specific example of the disclosure described in the SUMMARY.

While an embodiment of the disclosure has been described above with reference to the drawings, the disclosure is not limited to the embodiment and can be modified in various forms without departing from the gist of the disclosure.

The disclosure is applicable in the industry of manufacturing boost converter devices and the like.

What is claimed is:

1. A boost converter device comprising:
   a first boost converter including a first reactor and two switching elements that are a first upper arm and a first lower arm, the first boost converter being configured to perform exchange of an electric power accompanied by conversion of a voltage between a power supply and an electrical load;
   a second boost converter including a second reactor and two switching elements that are a second upper arm and a second lower arm, the second boost converter being configured to perform exchange of the electric power accompanied by conversion of the voltage between the power supply and the electrical load; and an electronic control unit configured to control the first boost converter and the second boost converter, the electronic control unit being configured to generate a first pulse width modulation signal by comparison between a first control duty for the first boost converter and a carrier, the electronic control unit being configured to control switching of the first upper arm based on the first pulse width modulation signal and to control switching of the first lower arm based on a first inverted signal acquired by inverting the first pulse width modulation signal, the electronic control unit being configured to generate a second pulse width modulation signal by comparison between a corrected control duty and the carrier, the corrected control duty being a duty acquired by subtracting a second control duty for the second boost converter from value 1, and the electronic control unit being configured to control switching of the second lower arm based on the second pulse width modulation signal and to control switching of the second upper arm based on a second inverted signal acquired by inverting the second pulse width modulation signal.

2. The boost converter device according to claim 1, further comprising a second electronic control unit configured to transmit a required carrier frequency to the electronic control unit, wherein the electronic control unit is configured to guard the required carrier frequency with upper and lower limits and to set a control carrier frequency, and the electronic control unit is configured to generate the carrier based on the control carrier frequency.

3. The boost converter device according to claim 1, further comprising a second electronic control unit configured to transmit a first required duty for the first boost converter and a second required duty for the second boost converter to the electronic control unit, wherein the electronic control unit is configured to guard the first required duty with upper and lower limits and to set the first control duty, and the electronic control unit is configured to guard the second required duty with upper and lower limits and to set the second control duty.

4. A control method for a boost converter device, the boost converter device including a first boost converter, a second boost converter, and an electronic control unit configured to control the first boost converter and the second boost converter, the first boost converter including a first reactor and two switching elements which are a first upper arm and a first lower arm, the first boost converter being configured to perform exchange of an electric power accompanied by conversion of a voltage between a power supply and an electrical load, the second boost converter including a second reactor and two switching elements which are a second upper arm and a second lower arm, the second boost converter being configured to perform exchange of the electric power accompanied by conversion of the voltage between the power supply and the electrical load, the control method comprising:

generating, by the electronic control unit, a first pulse width modulation signal by comparison between a first control duty for the first boost converter and a carrier;

controlling, by the electronic control unit, switching of the first upper arm based on the first pulse width modulation signal and controlling, by the electronic control unit, switching of the first lower arm based on a first inverted signal acquired by inverting the first pulse width modulation signal;

generating, by the electronic control unit, a second pulse width modulation signal by comparison between a corrected control duty and the carrier, the corrected control duty being a duty acquired by subtracting a second control duty for the second boost converter from value 1; and controlling, by the electronic control unit, switching of the second lower arm based on the second pulse width modulation signal and controlling, by the electronic control unit, switching of the second upper arm based on a second inverted signal acquired by inverting the second pulse width modulation signal.

* * * * *